(12) United States Patent
Puthenpura et al.

(10) Patent No.: US 8,953,488 B2
(45) Date of Patent: Feb. 10, 2015

(54) METHOD AND APPARATUS FOR OPTIMAL INTERCONNECTION OF TELECOMMUNICATION NODES VIA A RELIABLE MICROWAVE CLUSTERING

(75) Inventors: Sarat Puthenpura, Berkeley Heights, NJ (US); Syed Anwar Aftab, Budd Lake, NJ (US); Arun Jotshi, Parsippany, NJ (US); Kenneth G. Kristiansen, Jr., Sparta, NJ (US); Gopalakrishnan Meempat, East Brunswick, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1036 days.

(21) Appl. No.: 12/966,732

(22) Filed: Dec. 13, 2010

(65) Prior Publication Data

US 2012/0147782 A1    Jun. 14, 2012

(51) Int. Cl.
*H04L 12/28* (2006.01)
*G06F 15/173* (2006.01)
*H04W 40/24* (2009.01)
*H04L 12/715* (2013.01)

(52) U.S. Cl.
CPC .............. *H04W 40/24* (2013.01); *H04L 45/46* (2013.01)
USPC ........... 370/254; 370/252; 370/351; 709/223; 709/238

(58) Field of Classification Search
USPC ......................... 370/251, 254–256, 351, 352; 709/217–219, 223–226, 238–244
See application file for complete search history.

(56) References Cited

U.S. PATENT DOCUMENTS

| | | | | |
|---|---|---|---|---|
| 7,054,271 | B2 * | 5/2006 | Brownrigg et al. | 370/238 |
| 2002/0094798 | A1 * | 7/2002 | Nurminen et al. | 455/403 |
| 2003/0063568 | A1 * | 4/2003 | Teig et al. | 370/252 |
| 2004/0203799 | A1 * | 10/2004 | Siegel | 455/445 |
| 2004/0260808 | A1 * | 12/2004 | Strutt | 709/224 |
| 2007/0127393 | A1 * | 6/2007 | Car | 370/254 |
| 2007/0201411 | A1 * | 8/2007 | Behroozi | 370/338 |
| 2007/0253341 | A1 * | 11/2007 | Atkinson et al. | 370/252 |
| 2009/0059814 | A1 * | 3/2009 | Nixon et al. | 370/254 |
| 2010/0238800 | A1 * | 9/2010 | Teng | 370/225 |
| 2011/0053494 | A1 * | 3/2011 | Kobayakawa | 455/7 |
| 2012/0099481 | A1 * | 4/2012 | Dong et al. | 370/255 |

* cited by examiner

*Primary Examiner* — Ian N Moore
*Assistant Examiner* — Jenee Williams

(57) ABSTRACT

A method and apparatus for providing a topology for interconnection of telecommunication nodes in a communication network are disclosed. For example, the method obtains input data, and determines values of: at least one set, at least one parameter, and at least one variable associated with the communication network in accordance with the input data. The method then determines the topology for the interconnection via microwave links of the telecommunication nodes from an objective function in accordance with the at least one set, at least one parameter, and at least one variable, wherein the objective function is based on a plurality of penalty factors.

19 Claims, 4 Drawing Sheets

US 8,953,488 B2

METHOD AND APPARATUS FOR OPTIMAL INTERCONNECTION OF TELECOMMUNICATION NODES VIA A RELIABLE MICROWAVE CLUSTERING

The present disclosure relates generally to communication networks and, more particularly, to a method and apparatus for providing an optimal topology for interconnection of telecommunication nodes in a communication network, e.g., an optimal topology for interconnection of nodes in a cellular network.

BACKGROUND

As Internet usage continues to grow, more and more customers are accessing communications services via a mobile device, e.g., a cell phone, a smart phone, etc. For example, a customer may receive multimedia content via his/her cell phone and a wireless network. The cell phone transmits and receives voice and data packets to and from the service provider's network via a base station and an access network.

The customer's ability to access services via a mobile device is dependent on the reliability and the capacity of the network. For example, network elements, e.g., base station subsystems, radio access networks, cell site equipment, core network nodes, etc., need to be designed with adequate capacity and reliability to meet the need. The reliability of the network elements and the reliability of the connectivity between the network elements affect the ability of users to communicate via the network. One approach for planning the microwave network is manually manipulating parameters associated with each relevant factor (e.g., proximity of a base station to other base stations, capital cost, etc.) until an experienced planner deems the result satisfactory. Unfortunately, this manual approach is labor intensive and highly non-optimal for reliable network planning of large networks.

SUMMARY OF THE DISCLOSURE

In one embodiment, the present disclosure describes a method and apparatus for providing a topology for interconnection of telecommunication nodes in a communication network. For example, the method obtains input data, and determines values of: at least one set, at least one parameter, and at least one variable associated with the communication network in accordance with the input data. The method then determines the topology for the interconnection via microwave links of the telecommunication nodes from an objective function in accordance with the at least one set, at least one parameter, and at least one variable, wherein the objective function is based on a plurality of penalty factors.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for providing an optimal topology for interconnection of telecommunication nodes (often referred in this disclosure as cell sites) via a reliable microwave clustering in a communication network, e.g., a cellular network. Although the teachings of the present disclosure are discussed below in the context of providing interconnections for a wireless communication network, the teaching is not so limited. Namely, the teachings of the present disclosure can be applied for other types of communication networks, wherein the planning of reliable network (e.g., an access network) requires simultaneous consideration of multiple factors.

Microwave-based interconnection of telecommunication network entities (nodes) promotes rapid and cost-effective deployment. Microwave Links provide an attractive alternative due to relatively low capital cost requirement and relative ease of deployment. The alternative of fiber build-out can be extremely labor intensive, costly and time consuming. Leased networks could become cost prohibitive. Wireless carriers need to backhaul cell sites traffic via a radio access network (RAN) and this RAN transport cost represents a major cost component of telecommunication carriers. Microwave transport may then be beneficial given the growth in mobility and long-term evolution (LTE) rollout. Microwave transport may be even more beneficial in LTEs where each tower may generate approximately 100 or more Megabits per second (mbps) of traffic.

Figure 1:
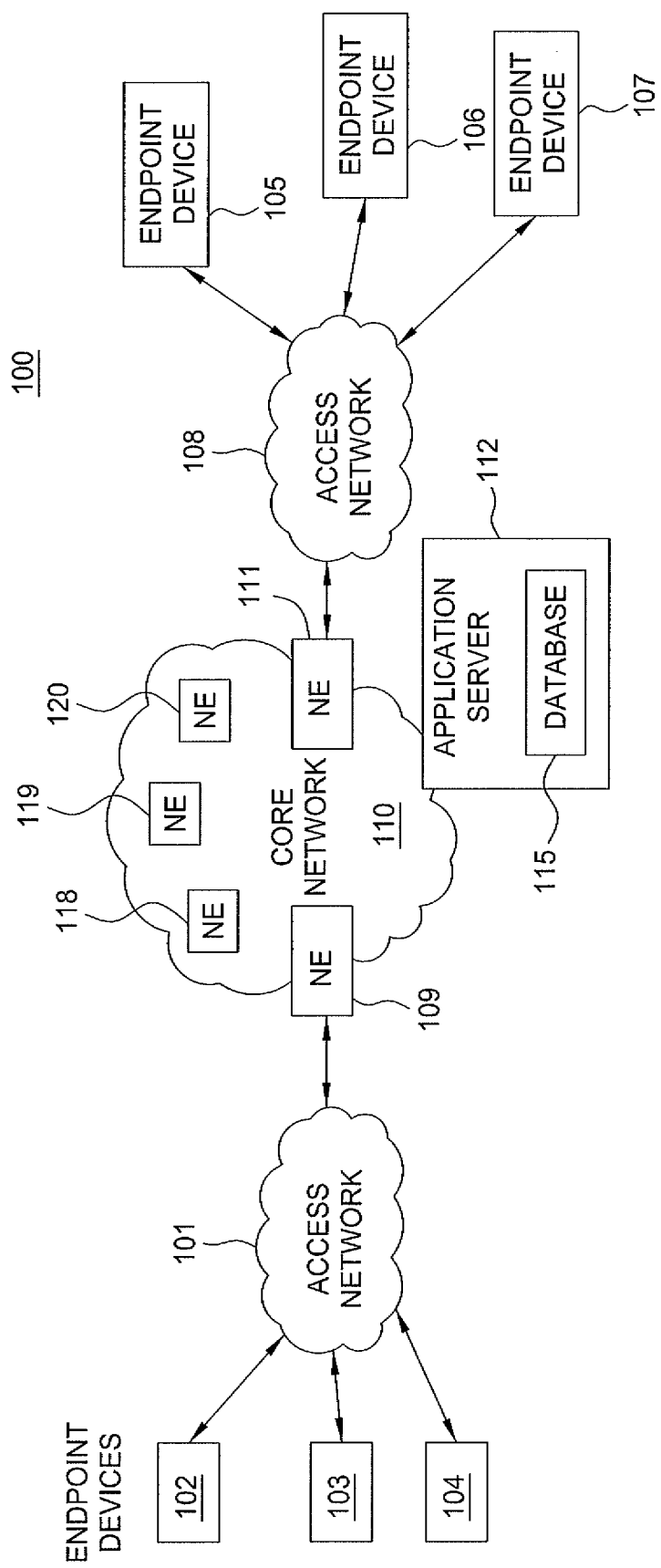
FIG. 1 is a block diagram depicting an illustrative network related to the current disclosure.

FIG. 1 is a block diagram depicting an illustrative network 100 related to the current disclosure. Illustrative networks may include Internet protocol (IP) networks, IP Multimedia Subsystem (IMS) networks, Ethernet networks, wireless networks and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a Base Station Subsystem (BSS), a $3^{rd}$ party network, a cellular network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g. voice and data services, are transmitted on networks.

In one embodiment, a service provider may enable customers to access services via a wireless access network, e.g. a base station subsystem or a radio access network. For example, a customer may use a cell phone or a smart phone to access Internet Protocol (IP) services, multimedia services, and the like. The packets from and to the wireless device, e.g., cell phone, may then traverse one or more base station subsystems, radio access networks and network equipment, e.g., base stations, backhaul equipment, etc.

The radio network controllers and base station controllers route calls from user endpoint devices towards their destination via the service provider's core network. Similarly, calls destined to the user endpoint devices traverse the core network to reach either a radio network controller (for 3G) or a base station controller (for 2G). As applicable, the radio network controller or the base station controller forwards the calls towards their intended user endpoint device via a base station. In order to support wireless services, the radio access networks and/or base station subsystems need to have adequate capacity and reliability.

One approach for planning a communication network based on Microwave topology is manually manipulating parameters associated with each relevant factor until an experienced planner deems the result satisfactory. For example, a planner may manually plan locations for base stations based on distance proximity to other base stations, capital cost, backhaul cost, geographical location, line of sight considerations, etc. Unfortunately, this manual approach is labor intensive and highly non-optimal for planning of large networks. Moreover, the result of the manual effort has no guarantees in terms of optimality and in terms of prevention of microwave interference.

There are some mathematical formulations available for manually generating a k-connected topology for microwave interconnection. However, designs based on current available mathematical formulations have shortcomings. For example, a topology based on k=1 generates a tree but there is no guarantee of reliability and a failure of a single node or a single link can bring down the entire network. Topologies based on k>1 generate sub-optimal solutions which are not cost effective. For example, k=2 generates a double connected (link disjoint) topology. Moreover, the selection of candidate microwave links that constitute the input to the mathematical model is performed without performing line-of-sight and path availability analysis. Hence, obtaining an optimal design via a manual approach is infeasible. Furthermore, there is no technique in place for preventing pairs of microwave beams of the resulting topology from being too close to each other—thereby causing potential interference. For example, the manual method lacks restrictions for minimum beam angle, restrictions for vertical/horizontal separation, and restrictions for preventing microwave beams from crossing each other.

The above shortcomings directly impact the performance and cost structure of the resulting radio access network. As such, the design of the network may impact the overall financial metrics of a wireless carrier and its market competitiveness.

In order to clearly describe the current method for providing an optimal topology for interconnection of telecommunication nodes via reliable microwave clustering in a communication network, the following microwave network terminologies are first provided:

A node;
A primary node;
A link;
A hop limit;
A path;
A pair of disjoint paths; and
Necklace topology.

In one embodiment, a node refers to a cell site that is to be clustered via microwave links. A node that is not a primary node is also referred to as a "cell site" or simply as a "site."

In one embodiment, a primary node refers to a node that is a traffic sink. The primary node is also referred to as a sink node, or as a donor-site. In one example, a node that connects traffic to a fiber network may be the sink node.

In one embodiment, a link refers to a microwave connection between two nodes, between two sites, or between a site and a sink.

In one embodiment, a hop limit refers to a limit on a maximum number of tandem microwave links allowed for a node (a non-sink node) to be connected to a primary node (sink) in a candidate microwave path.

In one embodiment, a path refers to a chain of microwave links connecting a node to a primary node (sink).

In one embodiment, a pair of disjoint paths refers to a pair of paths between a node and the primary node(s) to which the node is attached, wherein the pair of paths does not share any common link. For example, the design algorithm may engineer a topology that facilitates an enhanced robustness against link failures. The topology may be engineered such that there may be two distinct paths connecting a node to two different sink nodes, wherein none of the paths share any link between them.

In one embodiment, a "necklace topology" refers to a network topology in which each node is connected to at least one sink node via a path. However, the path for a particular node to sink-node connection may comprise any number of hops. That is, the number of hops can be n=1, ..., N. The N may be selected by the user (e.g., network planner). To increase resilience to a single link failure, redundancy requirements may be added. In one embodiment, any node 'i' with more than two microwave radios requires a degree of redundancy. In a preferred embodiment, any node 'i' with more than two microwave radios requires two sink nodes for the two link-disjoint paths originating from this node 'i'. Please note that the current disclosure does not limit the implementation of the current method to any of the topologies above.

In one embodiment, the current method provides an optimal interconnection of telecommunication nodes via microwave clustering in a wireless network. The method provides an optimal topology for interconnecting of the cell sites for a targeted level of reliability in a cost effective manner. However, this is not intended to be restrictive; those skilled in the art will recognize that the scope and utility of the teachings of this disclosure extend to any general communication networking scenario that can benefit from a cost-effective interconnection of fixed network infrastructure elements via microwave links. The method determines the optimal topology in accordance with several factors, e.g., the need to meet cost objectives (minimize overall cost), the need to meet reliability objectives, the need to exclude microwave links that may lead to lower performance (e.g., lower bit-level performance due to inadequate line of sight, limited path availability due to terrain, etc.), the need to exclude link pairs that may lead to microwave interference, and the like. However, the various factors need to be carefully weighed against each other. For example, a higher reliability target may be weighed against the cost of additional links, increasing a number of links may be weighed against the need to minimize interference, and so on.

In one embodiment, in order to provide an optimal topology for interconnecting the telecommunication nodes via a microwave clustering, the method defines an objective function that minimizes the total cost (penalties) based on the above factors, as required by a network planner. In one embodiment, the microwave design problem is posed as an integer linear programming problem (ILP), in which the objective function is expressed as a summation of costs (penalties) associated with one or more of: cost of deploying microwave links, penalty associated with microwave miles, penalty associated with not meeting line of sight objectives, penalty associated with a plurality of disjoint paths from a cell site being destined at a same sink node, penalty associated with a number of microwave dishes that should be located at a given cell site, etc. In one embodiment constraints are added for one or more of: exclusion of candidate links that do not meet line of sight requirements, restriction of the number of disjoint paths from a given cell site terminating at a same sink node, restriction of the maximum number of microwave dishes installed at any given cell site, exclusion of pairs of links whose geographical proximity can cause signal interference, etc.

In one embodiment, the objective function is expressed as:

$$\text{Total Cost} = \sum_{(j,k)\in LINK: j>k} \sum_{l\in Lnk\_Typ} \sum_{c=1}^{CapLvl[l]} z[j,k,l,c] * LinkCost[l,c] +$$
$$\sum_{(j,k)\in LINK: j>k} \sum_{l\in Lnk\_Typ} \sum_{c=1}^{CapLvl[l]} z[j,k,l,c] * DIST[j,k] +$$
$$\sum_{(j,k)\in LINK: j>k} \sum_{l\in Lnk\_Typ} \sum_{c=1}^{CapLvl[l]} z[j,k,l,c] * (\text{if } (j,k) \in$$
$$\text{NO\_LOS then LOS\_PENALTY else 1}) +$$
$$\sum_{i\in NODE} (\text{if } i \text{ goes to the same sink } p \text{ for its disjoint}$$
$$\text{paths then 1 else 0}) * \text{Same\_Sink\_Penalty} +$$
$$\sum_{w\in NODE} \max\{(radios[w] - MAX\_Radios[w]), 0\} *$$
$$\text{Radio\_Limit\_Penalty}$$

Equation (1)

It is important to note that the network planner may select one or more of the above factors as being associated with a hard-limit. For example, the network planner may provide a maximum number of microwave dishes at a site, limit the allowed links to only those with acceptable line of sight, disallow disjoint paths from a cell site from being destined to a same sink node, etc. The one or more factors with hard-limits may then be converted to constraints and be removed from the objective function. The objective function may then be solved subject to the various constraints to determine an optimal topology for providing interconnection of the cell sites.

For clarity purposes, the various terms used in the above equation (1) are described below. The method first defines the sets (Table 1), parameters (Table 2) and variables (Table 3) as shown below:

TABLE 1

| SETS | DESCRIPTION |
|---|---|
| i ∈ NODE | Set of Sites to be clustered via microwaves |
| p ∈ PNODE | Nodes that are the traffic sink, also known as primary node or donor nodes |
| (j, k) ∈ LINK ∀ j ⊆ {NODE ∪ PNODE} and k ⊆ (NODE ∪ PNODE} | Set of valid potential links between Site-Site (a cell site but not a primary node) and Site-Primary Node (a cell site that is a primary node). The valid potential links may be based on a pre-processing step that determines validity based on a maximum allowed link distance and microwave (MW) Range. The set includes links in both directions (j, k) and (k, j). |
| (j', k') ∈ NO_LOS; NO_LOS ⊆ LINK | Links without Line-Of-Sight. The set may be constructed either by users asking the model to eliminate such links entirely or by penalizing a link without a line-of-sight to discourage using such links. |
| l ∈ Lnk_Typ | Microwave link type, e.g., 6 GHz, 11 GHz, 18 GHz etc. It is important to note that the formulation can be adapted to do financial comparisons between Microwave, Fiber and Lease options in which case in addition to the MW types, Fiber and lease link types need to be included in this set. |
| (j, k, l, m) ∈ PAIR_EXCL; (j, k) ⊆ LINK and (l, m) ⊆ LINK | Link-pairs to be excluded from the final topology. The list may be provided by the users or generated by running the Link-Pair Exclusion algorithm of the current method (described below). |

TABLE 1-continued

| SETS | DESCRIPTION |
| --- | --- |
| (j, k, l) ∈ MW_LINK_EXCL; (j, k) ⊆ LINK and l ⊆ Lnk_Typ | Links to be excluded from the final topology. The list may be provided by the users or generated by running the line-of-sight and path availability analysis of the current method. |
| (j', k', l', m') ∈ PAIR_INCL; (j', k') ⊆ LINK and (l', m') ⊆ LINK | Link-pairs to be included into the final topology. The list may be provided by the users. |
| (j', k', l') ∈ MW_LINK_INCL; (j', k') ⊆ LINK and l' ⊆ Lnk_Typ | Link-to be included into the final topology. The list may be provided by the users. |

TABLE 2

| PARAMETERS | DESCRIPTION |
| --- | --- |
| Dmnd{i ∈ NODE} ≥ 1 | Demand/Traffic/bandwidth units to be carried/transported from/to each node. This may be input by the users. Typical units, as used in the field, are 'megabits per second'. For simplicity, the units are assumed as having integer values. |
| CapLvl{l ∈ Lnk_Typ} ≥ 0; integer | Capacity Level of a candidate link type l. A link of type l might have different capacity levels based on various equipment configurations. |
| Cap {l ∈ Lnk_Typ, c ∈ 1..CapLvl[l]} ≥ 0 | Actual Capacity of a link between two nodes j, k of type l. |
| LinkCost {l ∈ Lnk_Typ, c ∈ 1..CapLvl[l]} ≥ 0 | Cost of microwave links. The cost includes cost associated with two radios, other equipment, cabling, installation, maintenance, site acquisition, filing fee, etc. |
| Hop_Limit ≥ 0; integer | Maximum number of hops allowed for any given site to be connected to the final sink node. This parameter is configurable by users. |
| MAX_Radios{i ∈ NODE] ≥ 1; integer | Maximum number of microwave dishes to be allowed at a given site (user configurable). |
| DIST{(j, k) ∈ LINK} ≥ 0 | Geographical spans of candidate links between two locations. This parameter is useful in objective function while limiting the overall microwave miles. |
| LOS_Penalty | Penalty of using a link with no line of sight |

TABLE 3

| VARIABLES | DESCRIPTION |
| --- | --- |
| x[i, p, j, k, l]; of i ∈ NODE goes to p ∈ PNODE using (j, k) ∈ LINK of type l ∈ Lnk_Typ or not; binary variable | A variable with a binary outcome, which is set to one if a link j, k of type l is used for the path from node i to primary node p, and is set to zero otherwise. |
| y[j, k, l, i]; amount of traffic on link (j, k) ∈ LINK of type l ∈ Lnk_Typ due to node i ∀ j > k | A variable with values set to the amount of traffic on link j, k of type l due to node i. Note that the integer assumption is based on the previous assumption in table 2 regarding the demand traffic at each node being an integer value (for simplicity); this is not a limiting factor though. This variable can be replaced by a continuous variable with values > 0. |
| z[j, k, l, c]; number of links (j, k) ∈ LINK of type l ∈ Lnk_Typ and capacity level c ∈ 1..CapLvl[l] activated in the final topology; integer variable | A variable for the number of microwave links to be deployed between j, k of type l and capacity c to carry the traffic that needs to flow on this link as per the final microwave topology. |

TABLE 3-continued

| VARIABLES | DESCRIPTION |
|---|---|
| radios {j in NODE} = $$\sum_{(j,k) \in LINK: j>k} \sum_{l \in Lnk\_Typ} \sum_{c=1}^{CapLvl[l]} z[j, k, l, c] + \sum_{(k,j) \in LINK: k>j} \sum_{l \in Lnk\_Typ} \sum_{c=1}^{CapLvl[l]} z[k, j, l, c]$$ | A variable for total number of microwave dishes installed at each site. This is a dependent variable. |
| degfree {i in NODE} > 0; integer variable | A variable for degrees of freedom, which is driven by the selected microwave topology. There is no redundancy when degfree = 1 (tree topology), there are two distinct paths when degfree = 2 (mesh topology), and so on. For example, for standard redundancy, microwave engineers may use 2 disjoint paths. |

The method then accounts for the various factors of the objective function using the sets, parameters and variables provided in Tables 1-3.

In one embodiment, Equation 1 accounts for the penalty associated with the cost of deploying microwave links via the term:

$$\sum_{(j,k) \in LINK: j>k} \sum_{l \in Lnk\_Typ} \sum_{c=1}^{CapLvl[l]} z[j, k, l, c] * LinkCost[l, c]$$

Equation 1 accounts for the penalty associated with overall microwave miles via the term:

$$\sum_{(j,k) \in LINK: j>k} \sum_{l \in Lnk\_Typ} \sum_{c=1}^{CapLvl[l]} z[j, k, l, c] * DIST[j, k]$$

Equation 1 accounts for the penalty associated with not meeting line of sight objectives via the term:

$$\sum_{(j,k) \in LINK: j>k} \sum_{l \in Lnk\_Typ} \sum_{c=1}^{CapLvl[l]} z[j, k, l, c] *$$
(if $(j, k) \in$ NO_LOS then LOS_Penalty else 1)

Equation 1 accounts for the penalty associated with a plurality of disjoint paths from a cell site being destined at a same sink node via the term:

$$\sum_{i \in NODE} (\text{if } i \text{ goes to the same sink } p \text{ for its disjoint paths then 1 else 0}) *$$
Same_Sink_Penalty Equation 1 accounts for the penalty associated with a number of microwave dishes that should be located at a given cell site via the term:

$$\sum_{w \in NODE} \max\{(radios[w] - MAX\_Radios[w]), 0\} * Radio\_Limit\_Penalty$$

In one embodiment, the method also defines the constraints using the sets, parameter and variables provided in Tables 1-3. For example, the current method defines the following constraints for determining the optimal topology as discussed below.

In order to obtain the total traffic that flows through link (j,k) due to path(s) from node i to the sink nodes, the method adds the constraint:

subject to constraint LinearizeMinMax:

$$y[j, k, l, i] \geq \sum_{p \in PNODE: i \neq p} ((x[i, p, j, k, l] + x[i, p, k, j, l]) * Dmnd[i]) \forall (j, k) \in LINK,$$

$l \in$ Lnk_Typ, $i \in$ NODE and $j > k$

Then, based on the total traffic that flows through link (j,k) due to path(s) from all such nodes i to the sink nodes, the method needs to deploy microwave links between nodes j and k of type l and capacity c that can handle all this traffic. Therefore, the method adds the capacity based constraint:

subject to constraint Capacity:

$$\sum_{i \in NODE} y[j, k, l, i] \leq \sum_{c=1}^{CapLvl[l]} (z[j, k, l, c] * Cap[l, c]) \forall (j, k) \in LINK,$$

$l \in$ Lnk_Typ and $j > k$

In order to provide a number of links for traffic coming out of a node i, in accordance with the degrees of freedom, the method adds constraints based on the degrees of freedom. For example, for d links of type l coming out of node i for d-disjoint paths going to nodes p, the method adds the constraint:

subject to constraint trfsrc:

$$\sum_{p \in PNODE} \sum_{k \in NODE \cup PNODE:(i,k) \in LINK} \sum_{l \in Lnk\_Typ} x[i, p, i, k, l] =$$

$$degfree[i] \forall\ i \in NODE$$

In order to provide a number of links for traffic coming to a primary node (due to paths from nodes i to this primary node), in accordance with the degrees of freedom, the method adds constraints based on the degrees of freedom. For example, for d links of type l coming into nodes p due to d-disjoint paths from node i, the method adds the constraint:
subject to constraint trfsnk:

$$\sum_{p \in PNODE} \sum_{j \in NODE:(j,p) \in LINK} \sum_{l \in Lnk\_Typ} x[i, p, j, p, l] = degfree[i] \forall\ i \in NODE$$

All the flows on links coming into an intermediate node 'w' need to go out. Note that 'w' is not a starting node or the sink (end) node. Therefore, the intermediate node is subject to a constraint based on balancing the flows coming in and out of the node. Thus, the method adds the following constraint for intermediate nodes:
subject to constraint balance:

$$\sum_{k\ in\ NODE \cup PNODE:(w,k) \in LINK} \sum_{l \in Lnk\_Typ} x[i, p, w, k, l] =$$

$$\sum_{j \in NODE:(j,w) \in LINK} \sum_{l \in Lnk\_Typ} x[i, p, j, w, l] \forall\ i \in NODE,$$

$$p \in PNODE, w \in NODE \cup PNODE: w \neq i\ \text{and}\ w \neq p$$

In order to not use a link j,k of type l for the d-disjoint paths from node i to sinks p, the method adds the constraint:
subject to constraint disjointpath:

$$\sum_{p \in PNODE: i \neq p} (x[i, p, j, k, l] + x[i, p, k, j, l]) \leq 1 \forall\ i \in NODE,$$

$$(j, k) \in LINK, l \in Lnk\_Typ$$

In order to enforce a hop limit at a given site, the method adds the constraint:
subject to constraint Hop Limit:

$$\sum_{(j,k) \in LINK: j > k} \sum_{l \in Lnk\_Typ} (x[i, p, j, k, l] + x[i, p, k, j, l]) \leq$$

$$Hop\_Limit \forall\ i \in NODE, p \in PNODE$$

In order to enforce the limit on the number of maximum microwaves dishes that can be put on a site (including sink nodes), the method adds the constraint:
subject to constraint Radio Limit:

$$radios[j] <= MAX\_Radios[j] \forall j \in NODE$$

In order to enforce a line of sight elimination constraint, the method adds:

subject to constraint LOS Elimination:

$z[j,k,l,c]=0 \forall (j,k) \in LINK, l \in Lnk\_Typ, c \in CapLvl[l], j > k\ \text{and}\ (j,k) \in NO\_LOS$ In order to enforce link inclusion constraints, the method adds the constraint:
subject to Include Links:

$$\sum_{c=1}^{CapLvl[l]} z[j, k, l, c] \geq 1 \forall\ (j, k, l)\ \text{in MW\_LINK\_INCL}$$

In order to enforce Link-Pair inclusion constraints, the method adds subject to Include Link Pair:

$$\sum_{l \in Lnk\_Typ} \sum_{c1=1}^{CapLvl[l]} \sum_{c2=1}^{CapLvl[l]} (z[j, k, l, c1] + z[m, n, l, c2]) = 2 \forall\ (j, k) \in LINK,$$

$$(m, n) \in LINK\ \text{and}\ (j, k, m, n) \in PAIR\_INCL\ \text{and}\ m > n$$

In order to enforce Link exclusion constraints, the method adds subject to Exclude Links:

$$\sum_{c=1}^{CapLvl[l]} z[j, k, l, c] = 0 \forall\ (j, k, l)\ \text{in MW\_LINK\_EXCL}$$

In order to enforce Link-Pair exclusion constraints, the method adds:
subject to Exclude Link Pair:

$$\sum_{l \in Lnk\_Typ} \sum_{c1=1}^{CapLvl[l]} \sum_{c2=1}^{CapLvl[l]} (z[j, k, l, c1] + z[m, n, l, c2]) \leq 1 \forall\ (j, k) \in LINK,$$

$$(m, n) \in LINK\ \text{and}\ (j, k, m, n) \in PAIR\_EXCL\ \text{and}\ m > n$$

In one embodiment, the method may require outputting a "Variable" topology. This topology requires that a node i should be connected to at least one sink node. In the output topology, if node i has more than 'K' microwave radios, then the method may require a degree of redundancy (e.g., two). Note that the 'K' is user specific, e.g., 2. In order to obtain the redundancy, the method adds the constraint:
subject to Variable_Redundancy:

$(MAX\_Radios[i]*(degfree[i]-1))+(K-radios[i]) \geq 0 \forall i \in NODE$

In one embodiment, the method may require outputting a "necklace" topology. In order to obtain the necklace topology, the method adds the constraint below for cell sites that are not sink nodes. The constraint is:
subject to Necklace_radios $radios[i]=2 \forall i \in NODE$ The optimal solution for equation (1) that satisfies all the constraints defined above may then be found using a linear programming method. For example, a linear programming solver may be used.

As described above, constraints for excluding links and/or link pairs may be added for determining an optimal solution for equation (1) that meets the line-of-sight and path availability requirements, as well as interference requirements.

In one embodiment, the method first determines the appropriate constraints for line-of-sight and path availability. In one embodiment, the line-of-sight and path availability constraints are provided by the user. For example, the user may have other means for determining such criteria. For example, a terrain map may be used to identify rivers, mountains, buildings, weather patterns, etc. that may obstruct the microwave link. In another example, a government entity, e.g., The Federal Communications Commission (FCC), may have requirements that add constraints other than due to line-of-sight and path availability.

In one embodiment, the method then determines the appropriate constraints for pairs of links such that the microwave beams are not too close to each other. Microwave beams that are too close to each other may cause interference, thereby reducing the quality of a received signal. In one example, a pair of microwave beams coincident at a common node may have inadequate angular separation, thereby resulting in interference. In another example, a pair of non-coincident microwave beams may have inadequate physical separation (vertical or horizontal separation), thereby resulting in interference. In yet another example, the pairs of beams may cross each other.

In one embodiment, the current method determines constraints for link pair exclusions such that the resulting topology meets a minimum microwave beam angle restriction requirement and a vertical/horizontal separation requirement. The resulting topology has microwave beams that do not cross each other and do not interfere with each other.

In one embodiment, the constraints for link pair exclusion are provided by the user (network planner). For example, the user may have other means for determining if pairs of microwave beams when deployed together could cause interference. In another embodiment, the constraints for link pair exclusion are determined based on a geometrical analysis as described below.

For a given pair of microwave beams, the method determines if either a minimum angular separation rule (for coincident beams) or a minimum distance rule (non-coincident beams) is violated. If either the minimum angular separation rule (for coincident beams) or the minimum distance rule (for non-coincident beams) is violated, the method adds a link pair exclusion constraint for the given pair of microwave beams. For example, if one of the violating pairs of links thus identified is $\{(j,k), (m,n)\}$, where j and k denote the identities of the nodes connected by the link (j,k) and m and n denote the identities of the nodes connected by the link (m,n), a constraint of the form $Z_{jk}+Z_{mn} \leq 1$ is added to the ILP formulation, with $Z_{jk}$ and $Z_{mn}$ being binary variables indicative of the activation of the respective links. If a link is activated, the corresponding variable would assume a value of one, otherwise it would assume a value of zero. Since the sum of the values of the pair of link activation variables has to be less than or equal to one by virtue of the constraint, it is clear that at most one link is activated.

As described above, the determination of whether or not a link pair exclusion constraint is needed for a pair of links depends on the separation of the beams (angular or physical). In order to determine the need for the link pair exclusion constraint, the current method first determines the (angular or physical) separation between pairs of candidate microwave beams (i.e., candidate links). If a given pair of microwave beam is coincident at either edge, an angular separation is computed. If the given pair of microwave beam is non-coincident, the shortest distance between the pair of beams is computed. As applicable, the shortest distance computation or the angular separation computation is carried out, as described below.

Shortest distance computation: As noted earlier, for a given pair of non-coincident microwave beams (i.e., beams that belong to a same frequency band but physically not-coincident at any edge), only one of the pair of beams is allowed to be activated if the shortest distance between the pair of the beams is less than a specified minimum threshold. To aid in determining if only one of the pair of beams should be allowed to be activated, the method proceeds to compute the shortest distance between each pair of beams of interest, starting from the geographical locations of their end points. To aid the process of determining the shortest distance between each pair of beams, the spatial coordinates of the four edges are first specified in Cartesian format (e.g., Hcoord, Vcoord) along with the antenna height at each edge based on a common reference (all metrics being expressed in identical units).

First, let $D_{min}(X,Y)$ represent the minimum distance between the entities X and Y, either of which could be a point, an infinite line or a line segment.

Consider the set of four points in an n-dimensional space are denoted by: $A=(a_1, \ldots, a_n); B=(b_1, \ldots, b_n); C=(c_1, \ldots c_n); D=(d_1, \ldots, d_n)$.

The four points A, B, C and D may then be regarded as denoting respective position vectors with reference to an arbitrary origin. Let $\vec{P}$ denote a directed line segment from point A to point B and $\vec{Q}$ denote a directed line segment from point C to point D. In the context of the microwave beam proximity analysis of the present disclosure, $\vec{P}$ and $\vec{Q}$ represent the two microwave beams (directionality being chosen at random, though necessary for the mathematical treatment below), with A and B being the nodes connected by $\vec{P}$ and C and D being the nodes connected by $\vec{Q}$. Also for this analysis, n=2 or 3; n=2 in a simplified 2-dimensional case where all microwave antennas are assumed to be of the same elevation, and n=3 in a more general case where this assumption is not employed. The objective is to calculate the shortest distance $D_{min}(\vec{P},\vec{Q})$ between $\vec{P}$ and $\vec{Q}$.

Then, let $\vec{p}$ denote the infinite line passing through the points A and B, and $\vec{q}$ denote an infinite line passing through the points C and D. The position vector of any point along the infinite line $\vec{p}$ may be parametrically defined as:

$P(s)=A+(B-A)s, -\infty<s<\infty$.

Similarly, the position vector of any point along the infinite line $\vec{q}$ may be parametrically defined as: $Q(t)=C+(D-C)t, -\infty<t<\infty$. Note that the position vectors of the points within the finite line segment $\vec{P}$ are given by:

$P(s): 0 \leq s \leq 1$.

Similarly, the position vectors of the points within the finite line segment and $\vec{Q}$ are given by $Q(t): 0 \leq t \leq 1$. The distinction among $\vec{p}$, $\vec{P}$ and $P(s)$ (similarly, among $\vec{q}$, $\vec{Q}$ and $Q(t)$) may be noted. The remainder of the computation of the shortest distance $D_{min}(\vec{P},\vec{Q})$ is carried out in two steps, Step I and Step II.

Step I of shortest distance computation: In the first step, the method first checks if the infinite lines $\vec{p}$ and $\vec{q}$ are parallel. Specifically, the infinite lines $\vec{p}$ and $\vec{q}$ are parallel if the vector cross product given by $(D-C) \times (B-A)$ equals zero. For example, for n=3, $(d_2-c_2) \cdot (b_3-a_3)-(d_3-c_3) \cdot (b_2-a_2)=0$; $(d_1-c_1) \cdot (b_3-a_3)-(d_3-c_3) \cdot (b_1-a_1)=0$; and $(d_1-c_1) \cdot (b_2-a_2)-(d_2-c_2) \cdot (b_1-a_1)=0$.

If the infinite lines $\vec{p}$ and $\vec{q}$ are parallel (cross product is equal to zero), the method may then skip the remainder of Step I and proceed to the Step II. Otherwise, the method continues in Step 1 to determine the shortest distance of the non-parallel lines as follows:

The vector extending from an arbitrary point along $\vec{P}$ to an arbitrary point along the infinite line $\vec{Q}$ is given by:

$$\Psi(s,t)=Q(t)-P(s)=(C-A)+(D-C)t+(A-B)s, -\infty<s,t<\infty.$$

The $L_2$ norm of the vector extending from the arbitrary point along $\vec{P}$ to the arbitrary point along the infinite line $\vec{Q}$ is then $\|\Psi(s,t)\|^2$. The $L_2$ norm is then given by:

$$\|\Psi(s,t)\|^2=\|(C-A)+(D-C)t+(A-B)s\|^2, =\Sigma_{i=1}^n\{(c_i-a_i)^2+ (d_i-c_i)^2 t^2+(a_i-b_i)^2 s^2+2(c_i-a_i)(d_i-c_i)t+2(c_i-a_i)(a_i-b_i)s+2(d_i-c_i)(a_i-b_i)st\}, -\infty<s,t<\infty.$$

The shortest distance $D_{min}(\vec{P},\vec{Q})$ between the infinite lines $\vec{P}$ and $\vec{Q}$ is given by the minimum length of the vector $\Psi(s,t)$, which is obtained by setting the partial derivatives of the $L_2$ norm $\|\Psi(s,t)\|^2$ to zero.

$$\frac{\partial\|\Psi(s,t)\|^2}{\partial s}=0 \to s\sum_{i=1}^n (a_i-b_i)^2 + t\sum_{i=1}^n (d_i-c_i)(a_i-b_i) + \sum_{i=1}^n (c_i-a_i)(a_i-b_i) = 0$$

$$\frac{\partial\|\Psi(s,t)\|^2}{\partial t}=0 \to s\sum_{i=1}^n (d_i-c_i)(a_i-b_i) + t\sum_{i=1}^n (d_i-c_i)^2 + \sum_{i=1}^n (c_i-a_i)(d_i-c_i) = 0$$

Another approach for obtaining the same set of equations is by observing that $\Psi(s,t)$ has a minimum length when it is perpendicular to both $P(s)$ and $Q(t)$, leading to the relations $\Psi(s,t)\cdot\partial P(s)/\partial s=0$ and $\Psi(s,t)\cdot\partial Q(t)/\partial t=0$, which reduces to the same equations as above. In matrix form the above set of relations can be stated as:

$$\begin{bmatrix} \sum_{i=1}^n (a_i-b_i) & \sum_{i=1}^n (d_i-c_i)(a_i-b_i) \\ \sum_{i=1}^n (d_i-c_i)(a_i-b_i) & \sum_{i=1}^n (d_i-c_i)^2 \end{bmatrix} \begin{bmatrix} s \\ t \end{bmatrix} = \begin{bmatrix} \sum_{i=1}^n (a_i-c_i)(a_i-b_i) \\ \sum_{i=1}^n (a_i-c_i)(d_i-c_i) \end{bmatrix}.$$

The minimization values of the parameters $s^*$ and $t^*$ are obtained via Cramer's rule as follows:

$$s^* = \frac{\sum_{i=1}^n (a_i-c_i)(a_i-b_i)\cdot\sum_{i=1}^n (d_i-c_i)^2 - \sum_{i=1}^n (d_i-c_i)(a_i-b_i)\cdot\sum_{i=1}^n (a_i-c_i)(d_i-c_i)}{\sum_{i=1}^n (a_i-b_i)^2\cdot\sum_{i=1}^n (d_i-c_i)^2 - \left[\sum_{i=1}^n (d_i-c_i)(a_i-b_i)\right]^2};$$

and $$t^* = \frac{\sum_{i=1}^n (a_i-b_i)^2\cdot\sum_{i=1}^n (a_i-c_i)(d_i-c_i) - \sum_{i=1}^n (a_i-c_i)(a_i-b_i)\cdot\sum_{i=1}^n (d_i-c_i)(a_i-b_i)}{\sum_{i=1}^n (a_i-b_i)^2\cdot\sum_{i=1}^n (d_i-c_i)^2 - \left[\sum_{i=1}^n (d_i-c_i)(a_i-b_i)\right]^2}.$$

If $0\leq s^*\leq 1$ and $0\leq t^*\leq 1$, then the corresponding position vectors terminate within the line segments $\vec{P}$ and $\vec{Q}$, respectively, in which case, the method outputs the shortest distance between $\vec{P}$ and $\vec{Q}$ given by:

$$D_{min}(\vec{P},\vec{Q}) = D_{min}(\vec{P},\vec{Q}) = \sqrt{\|\Psi(s^*,t^*)\|^2}$$

(where $s^*$ and $t^*$ are computed as shown above). The method then proceeds directly to the exit point of the link pair exclusion constraint generation algorithm further below and exits. It may be noted that for the case of n=2, $D_{min}(\vec{P},\vec{Q})=0$. If on the other hand $s^*$ and $t^*$ do not both fall in the range (0,1), then the above results are discarded and the method continues below to Step II of the algorithm.

Step II of the algorithm is entered at this point, either if the beams were deemed parallel (by virtue of the cross product evaluating to zero) at the beginning of Step I, or if the exit condition failed in the paragraph above. In this case, the shortest distance $D_{min}(\vec{P},\vec{Q})$ between $\vec{P}$ and $\vec{Q}$, is given by: $D_{min}(\vec{P},\vec{Q})=\text{Minimum}\{D_{min}(A,\vec{Q}), D_{min}(B,\vec{Q}), D_{min}(C,\vec{P}), D_{min}(D,\vec{P})\}$.

The computation of each of the four terms above is exemplified by the computation of $D_{min}(A,\vec{Q})$ as described below. The method first calculates the shortest (i.e., perpendicular) distance $D_{min}(A,\vec{Q})$ from the point A to the infinite line $\vec{Q}$. The vector from point A to an arbitrary point on $\vec{Q}$, $V_Q^A(t)$, is given by:

$$V_Q^A(t)=Q(t)-A=C-A+(D-C)t.$$

The length of $V_Q^A(t)$ is computed as:

$$\sqrt{\|V_Q^A(t)\|^2} = \sqrt{\sum_{i=1}^n [(c_i-a_i)+(d_i-c_i)t]^2}.$$

$V_Q^A(t)$ is perpendicular to $Q(t)$ and thus of minimum length at the value of t such that that $V_Q^A(t)\cdot\partial Q(t)/\partial t=0$. i.e., $[C-A+(D-C)t]\cdot[D-C]=0$ Denoting the value of t that satisfies the above relation by $t'_{AQ}$ and solving, the method obtains:

$$t'_{AQ} = \frac{\sum_{i=1}^n (a_i-c_i)(d_i-c_i)}{\sum_{i=1}^n (d_i-c_i)^2}; D_{min}(A,\vec{Q}) = \sqrt{\|V_Q^A(t'_{AQ})\|^2}.$$

Note that $$D_{min}(A, \vec{Q}) = \text{Minimum}\left\{\sqrt{\|V_Q^A(t)\|^2} : 0 \leq t \leq 1\right\}.$$

This minimum is achieved at $t=t'_{AQ}$ if $0 \leq t'_{AQ} \leq 1$. Otherwise, the minimum is achieved at the point $t=0$ or the point $t=1$, whichever is closest to $t'_{AQ}$. In other words, the method first computes the minimization scalar point $\hat{t}_{AQ}$ given by:

$$\hat{t}_{AQ} = \text{Min}\{\text{Max}[0, t'_{AQ}], 1\}$$
$$= \text{Min}\left\{\text{Max}\left[0, \frac{\sum_{i=1}^{n}(a_i - c_i)(d_i - c_i)}{\sum_{i=1}^{n}(d_i - c_i)^2}\right], 1\right\},$$

and $D_{min}(A, \vec{Q})$ is given by:

$$D_{min}(A, \vec{Q}) = \sqrt{\|V_Q^A(\hat{t}_{AQ})\|^2} = \sqrt{\sum_{i=1}^{n}[(c_i - a_i) + (d_i - c_i)\hat{t}_{AQ}]^2}.$$

Similarly, to compute $D_{min}(B, \vec{Q})$, the method first determines $\hat{t}_{BQ}$ given by:

$$\hat{t}_{BQ} = \text{Min}\{\text{Max}[0, t'_{BQ}], 1\}$$
$$= \text{Min}\left\{\text{Max}\left[0, \frac{\sum_{i=1}^{n}(b_i - c_i)(d_i - c_i)}{\sum_{i=1}^{n}(d_i - c_i)^2}\right], 1\right\},$$

and $D_{min}(B, \vec{Q})$ is given by:

$$D_{min}(B, \vec{Q}) = \sqrt{\|V_Q^B(\hat{t}_{BQ})\|^2} = \sqrt{\sum_{i=1}^{n}[(c_i - b_i) + (d_i - c_i)\hat{t}_{BQ}]^2}.$$

Then, in order to compute $D_{min}(C, \vec{P})$, the method determines $$\hat{s}_{CP} = \text{Min}\{\text{Max}[0, s'_{CP}], 1\}$$
$$= \text{Min}\left\{\text{Max}\left[0, \frac{\sum_{i=1}^{n}(c_i - a_i)(b_i - a_i)}{\sum_{i=1}^{n}(b_i - a_i)^2}\right], 1\right\};$$

which leads to:

$$D_{min}(C, \vec{P}) = \sqrt{\|V_P^C(\hat{s}_{CP})\|^2} = \sqrt{\sum_{i=1}^{n}[(a_i - c_i) + (b_i - a_i)\hat{s}_{CP}]^2}.$$

Then, $$\hat{s}_{DP} = \text{Min}\{\text{Max}[0, s'_{DP}], 1\}$$
$$= \text{Min}\left\{\text{Max}\left[0, \frac{\sum_{i=1}^{n}(d_i - a_i)(b_i - a_i)}{\sum_{i=1}^{n}(b_i - a_i)^2}\right], 1\right\}.$$

which yields:

$$D_{min}(D, \vec{P}) = \sqrt{\|V_P^D(\hat{s}_{DP})\|^2} = \sqrt{\sum_{i=1}^{n}[(a_i - d_i) + (b_i - a_i)\hat{s}_{DP}]^2}.$$

The method then proceeds to determine the shortest distance $D_{min}(\vec{P}, \vec{Q})$ via the minimization operation described earlier, and proceeds to the exit point of the link pair exclusion constraint generation algorithm further below.

For microwave beams that are coincident at a common edge, the angular distance computation proceeds as follows. As mentioned before, among any given pair of 3-dimensional microwave beam candidates that radiate from a common vertex in the horizontal and vertical (Hcoord-Vcoord) plane (i.e., there can be vertical separation), only one beam should be allowed to be activated.

The condition can be expressed as a condition on: {Vertical separation at the common vertex < a specified threshold value} AND {the angular separation at the common vertex $\Phi$ is less than a specified threshold $\Phi_{min}$}.

The computation of the angular separation $\Phi$ is described below. For this, the method ignores the third dimension (height), and assumes that the Hcoord and Vcoord values are represented by the first two dimensions. Accordingly, consider the points:

$A = (a_1, a_2); B = (b_1, b_2); C = (c_1, c_2),$ with beam $\vec{P}$ oriented from A to B and beam $\vec{Q}$ oriented from C to B (B being the common vertex).

The reference angle of $\vec{P}$, $\Omega_P$, (measured from geographic east in the clockwise direction) is then given by the following logic:

```
If (a₁ - b₁ = 0) then
    If (a₂ - b₂ = 0) then Ω_P = 0
    Else if (a₂ - b₂ > 0) then Ω_P = π/2
    Else Ω_P = -π/2
Else
    Ω_P = tan⁻¹ (a₂ - b₂)/(a₁ - b₁)
    If (a₁ - b₁ < 0) then Ω_P = Ω_P + π
End if
```

Similarly, the reference angle of $\vec{Q}$, $\Omega_Q$, is given by the following logic:

If $(c_1 - b_1 = 0)$ then
   If $(c_2 - b_2 = 0)$ then $\Omega_Q = 0$
   Else if $(c_2 - b_2 > 0)$ then $\Omega_Q = \pi/2$
   Else $\Omega_Q = -\pi/2$
Else $$\Omega_Q = \tan^{-1}\frac{c_2 - b_2}{c_1 - a_1}$$

If $(c_1 - b_1 < 0)$ then $\Omega_Q = \Omega_Q + \pi$
End if

Then, the angular separation at the common vertex $\Phi$ is given by:

$\Phi = \text{Min}\{|\Omega_P - \Omega_Q|, 2\pi - |\Omega_P - \Omega_Q|\}$.

Exit point of the link pair exclusion constraint generation logic: Once either the angular separation or the minimum distance $D_{min}(\vec{P},\vec{Q})$ for a pair of microwave links is determined, it is compared to the respective threshold. For each pair of microwave links P and Q (directionality is omitted) that is deemed excludable, a link-pair exclusion constraint is added to the objective function. For example, for the above pairs of links, the constraint: $x_P + x_Q \leq 1$, is added. The $x_P$ and $x_Q$ are binary variables indicative of the activation of the respective microwave links.

In the above description of the current method, the link-pair exclusion constraints were used to determine an optimal solution (a topology) for the objective function in equation (1) in a single step. That is, the method first exhaustively identified all possible pairs of link candidates that may violate the physical or angular separation rules and added a constraint up front for each pair found to be in violation of the separation rules. However, as can be appreciated, this can lead to a very large number of constraint equations especially in large networks. Insertion of such an exhaustive list of link-pair exclusion constraints may make the ILP more difficult to solve. In one embodiment, the current method therefore provides a multi-step approach.

The multi-step approach first formulates the objective function with all the various criteria originally stipulated in Equation 1, but omitting the link-pair exclusion constraints. The method then determines a topology by solving the objective function. The method then evaluates the resulting topology to determine if there are any pairs of instantiated links that may be interfering with each other. That is, the method determines if there are any pairs of instantiated links that violate the separation rules, by applying the computational procedure above to each such pair. For each pair of links that violates the separation rules, the method then augments the objective function with a corresponding link-pair exclusion constraint. The method then determines a new topology (e.g., by rerunning the ILP solver) with the additional constraints. The resulting topology may again be evaluated to determine if there are pairs of links that violate the separation rules, in which case the ILP is solved afresh with further constraints, and so on till successful termination. Thus, for large networks, the final topology that satisfies the objective function and all the constraints may then be found via a multi-step approach without overwhelming the ILP solver or consuming excessive central processing unit (CPU) resources.

The resulting final topology may then be provided to the user. In one embodiment, the user may specify one or more reports to be generated. For example, a report may be generated for network planning purposes, project handoff, for generating forms to be provided to a regulatory agency, e.g., FCC, etc.

In one embodiment, the topology may be provided to the user via a graphical user interface for visualization. In one embodiment, the user may provide feedback on the final topology such that improvements can be made. In one embodiment, the feedback may be providing an input that requires the objective function and/or constraints to be re-formulated.

In one embodiment, the feedback may retain the objective function and constraints while modifying one or more values of parameters. For example, the method may modify a degree of redundancy, a number of radios allowed at a given entity, a maximum number of allowed hops to reach a sink node, a maximum number of allowable entities in a clustered topology (e.g., a necklace topology), etc. The method may also remove entities (cell sites and sink nodes) that are part of the clustered output.

In one embodiment, the feedback may include generating a report based on a user preference. For example, the user may change the preferences for viewing the topology, reporting the topology, etc.

Figure 2:
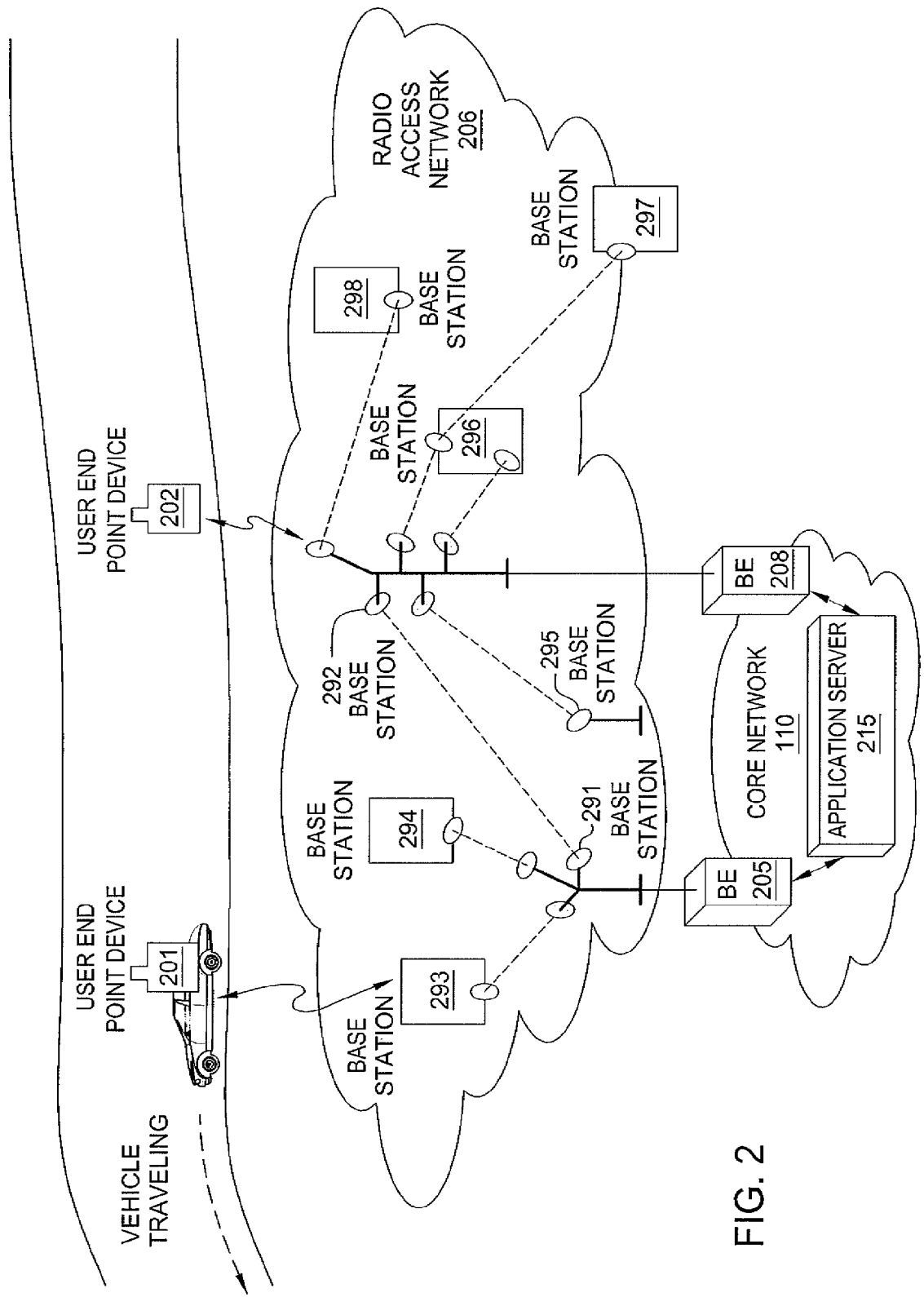
FIG. 2 provides an exemplary network with the current method for providing a topology for interconnection of telecommunication nodes in a communication network.

FIG. 2 provides an exemplary illustration 200 of a network with the current method for providing an optimal topology for interconnection of telecommunication nodes in a communication network. For example, the current method for providing a topology for interconnection of telecommunication nodes is implemented in an application server 215 located in the core network 110. Alternatively, the application server 215 can be deployed external to the core network. The end point devices communicate with the core network 110 via radio access network 206 and a border element (BE) 205 or 208.

In one embodiment, the radio access network 206 comprises base stations 291-298 and one or more radio network controllers (not shown). Base stations 291 and 292 are base stations at traffic sink nodes (i.e., primary nodes). The base stations 293-298 comprise ordinary cell sites. The base stations 291-298 communicate with one or more user endpoint devices 201-202 via a wireless interface.

Figure 3:
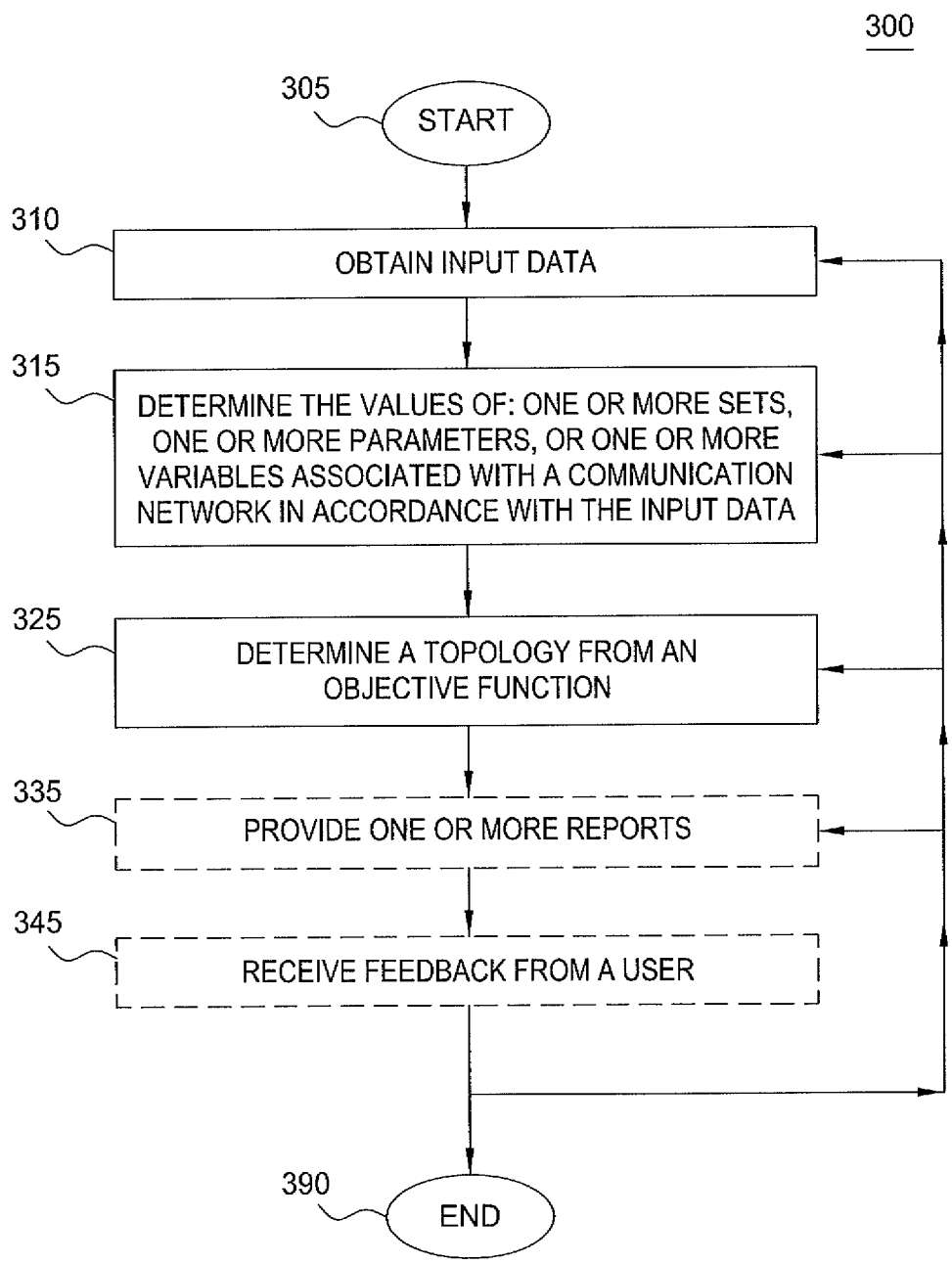
FIG. 3 illustrates a flowchart of the method for providing a topology for interconnection of telecommunication nodes in a communication network.

FIG. 3 illustrates a flowchart of the method 300 for providing a topology for interconnection of telecommunication nodes in a communication network, e.g., a 3G network, a 2G network, etc. The method 300 may be implemented in an application server (or a general purpose computer as disclosed in FIG. 4 below) located in the service provider's network. For example, the method may be implemented in the application server 215 deployed in the core network 110. Method 300 starts in step 305 and proceeds to step 310.

In step 310, method 300 obtains input data. For example, the input data may be data for determining values of one or more sets, one or more parameters or one or more variables associated with the communication network. For example, the input data for a 3G network may comprise one or more of: a list of telecommunication nodes that are considered sink nodes; a list of telecommunication nodes that are considered cell sites; a list of links to be included in the topology (the topology derived via the current method); a list of link-pairs to be included in the topology; a list of links to be excluded from the topology; a list of link-pairs to be excluded from the topology; a maximum number of hops to be allowed between a cell site and a sink node; a maximum number of antennas to be allowed at a cell site; a degree of redundancy associated with each cell site (the degree of redundancy determines the topology as required by the Microwave planner); a maximum number of cell sites allowed in a clustered Microwave topology; a maximum number of sink nodes allowed in the topology; traffic demand associated with each cell site; a list of types of links; a capacity level of each type of link; an actual capacity of each link between two telecommunication nodes of each type of link (based on the final topology); a cost associated with each link; a distance between each pairs of cell sites, etc.

In step 315, method 300 determines the values of: one or more sets, one or more parameters, or one or more variables associated with the communication network in accordance with the input data. For example, for the cellular network, the method may determine: a set for sites to be clustered via microwaves; a set for nodes that are sink nodes; a set for valid potential links between each of the sites to be clustered and one or more sink nodes; a set for links without Line-Of-Sight (LOS); a set for microwave link types; a set for links to be excluded from the final topology; a set for link-pairs to be excluded from the final topology; a set for links to be included in the final topology; a set for link-pairs to be included in the final topology, etc. In one example, the method may determine values for each of the parameters: demand associated with each node; capacity level of each link type; actual capacity of each link between each pair of nodes of each link type; cost of microwave links (e.g., cost associated with two radios, other equipment, installation, maintenance, etc.); a maximum number of hops allowed for each given site to be connected to the final sink node for the site; a maximum number of microwaves dishes to be allowed at each given site; and distances between each pair of locations.

In one embodiment, the set for links to be excluded from the final topology is constructed via a user input that provides a preference to the current method, wherein the preference indicates that links without line-of-sight are to be eliminated. In one embodiment, the current method then uses the preference to perform pre-processing to identify and eliminate all such links from consideration. For example, the validity of each potential link may be determined by performing pre-processing based on a maximum allowed link distance and a microwave (MW) range.

In one embodiment, the set of links to be excluded from the final Microwave topology is constructed by adding a penalty term in the objective function such that a link without a line-of-sight is discouraged from being selected.

In one embodiment, the set for link-pairs to be excluded from the final topology is constructed via a user input that provides a preference to the current method, wherein the preference indicates that link-pairs that fail to meet a separation rule are to be eliminated. In one embodiment, the current method then uses the preference to perform pre-processing to identify and eliminate such pairs of links that fail to meet one or more separation rules. For example, the validity of each pair of links may be determined by running a link-pair exclusion algorithm of the current method that determines if a minimum microwave beam angle restriction requirement and a vertical/horizontal separation requirement are met. For link-pairs that fail to meet at least one of the separation requirements, the method adds constraints for link pair exclusions such that the final topology is determined subject to the added link-pair exclusion constraints.

In one embodiment, the set for link-pairs to be excluded from the final topology is constructed via a user input that provides pairs of links that should not be activated at the same time. For example, the user (e.g., a network planner) may know some microwave beams that cross each other. The list may then be provided by the users.

In step 325, method 300 determines a topology for the interconnection of the nodes from an objective function in accordance with the one or more sets, one or more parameters, or one or more variables, wherein the objective function is based on one or more penalty factors. For example, the objective function may be defined based on one or more of the following penalty factors: costs of deploying microwave links, penalty associated with microwave miles, penalty associated with not meeting line of sight objectives, penalty associated with a plurality of disjoint paths from a cell site being destined at a same sink node, penalty associated with a number of microwave dishes that should be located at a given cell site. The topology is then the topology that minimizes the penalty over all the above factors. That is, the topology minimizes the objective function provided in Equation (1), while meeting all the above constraints. The method then proceeds to optional step 335.

In optional step 335, method 300 provides one or more reports. For example, the method may generate a report for network planning purposes, a report for a project handoff, a report for generating forms to be provided to a regulatory agency, a map illustrating the connectivity of cell sites in accordance with the topology, etc. In one embodiment, the topology may be provided to the user via a graphical user interface for visualization. The method then proceeds to optional step 345.

In optional step 345, method 300 receives feedback from a user. For example, a network planner may provide feedback on the topology such that improvements can be made. In one embodiment, the feedback may be providing an input that requires the objective function and/or constraints to be re-formulated. In one embodiment, the feedback may retain the objective function and constraints while modifying one or more of: sets, parameters and variables. For example, the method may modify a degree of redundancy, a number of radios allowed at a given entity, a maximum number of allowed hops to reach a sink node, a maximum number of allowable entities in a clustered topology (e.g., a necklace topology), etc. The method may also remove sites (ordinary cell sites and/or sink nodes) that are part of the clustered output.

In one embodiment, the feedback may be to generate a report based on a user preference. For example, the user may change the preferences for viewing the final topology that is already determined. The method then either proceeds to step 390 to end processing the current input data, or to any one of the steps 310, 315, 325 or 335.

It is important to note that the above method 300 for determining the topology for interconnection of telecommunication nodes in a communication network may determine the topology via a multi-step approach or a single step approach. In one embodiment, the method may first identify all possible pairs of links that may violate the physical or angular separation rules and add a constraint for each pair found to be in violation of the separation rules, thereby determining the topology in a single step. That is, the optimal topology that minimizes the objective function provided in Equation (1), while meeting all the above constraints is determined in a single step.

In one embodiment, the method first formulated the objective function with link exclusion constraints and other criteria, thereby omitting the link-pair exclusion constraints. The method then determines a first topology by solving the objective function. The method then evaluates the first topology to determine if there are any pairs of links that may violate the separation rules. For each pair of links that violate the separation rules, the method then augments the objective function with a corresponding link-pair exclusion constraint. The method then determines a second topology by re-running the algorithm with the additional constraints. The second topology may again be evaluated to determine if there are pairs of links that violate the separation rules, and so on. The final topology is then determined iteratively by running the algorithm until all objectives and constraints are met. That is, the topology that minimizes the objective function provided in Equation (1), while meeting all the above constraints is determined iteratively.

It should be noted that although not specifically stated, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
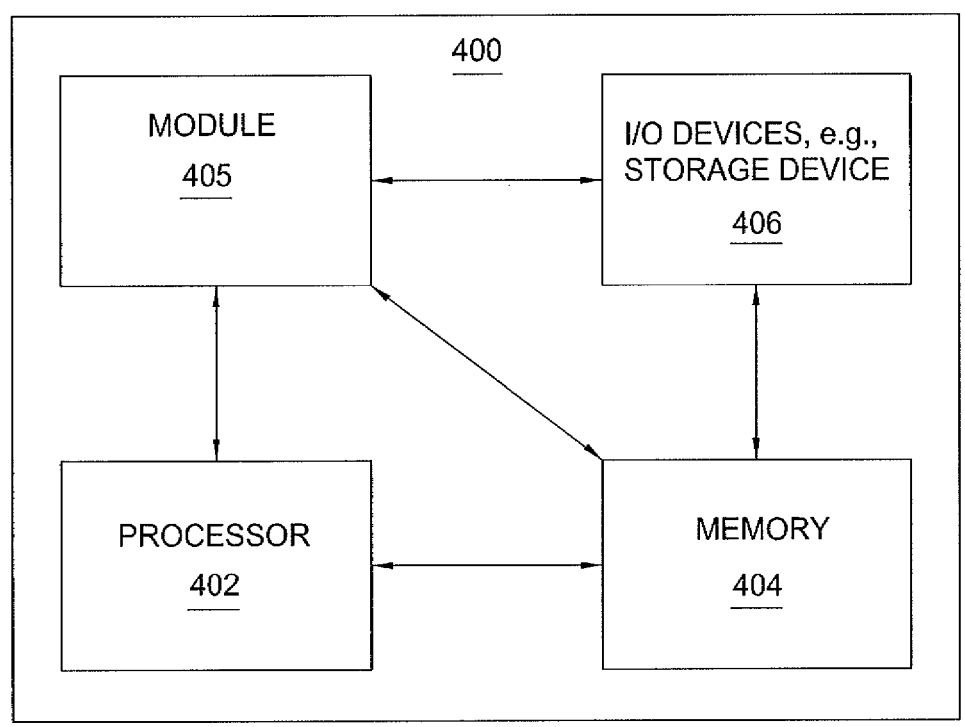
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a topology for interconnection of telecommunication nodes in a communication network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 405 for providing a topology for interconnection of telecommunication nodes in a communication network, can be loaded into memory 404 and executed by processor 402 to implement the functions as discussed above. As such, the present method 405 for providing a topology for interconnection of telecommunication nodes in a communication network (including associated data structures) of the present disclosure can be stored on a non-transitory (tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a topology for interconnection of telecommunication nodes in a communication network, comprising:
obtaining, via a processor, input data;
determining, via the processor, values of: a set, a parameter, and a variable associated with the communication network in accordance with the input data; and
determining, via the processor, the topology for the interconnection via microwave links of the telecommunication nodes from an objective function in accordance with the set, the parameter, and the variable, wherein the objective function is based on a plurality of penalty factors, wherein the plurality of penalty factors comprises a penalty factor associated with a failure to meet a line-of-sight objective,
wherein the determining the values associated with the communication network comprises determining at least one of: a set for telecommunication nodes that are sink nodes, a set for links without line-of-sight, a set for microwave link types, a set for links to be excluded from the topology, a set for link-pairs to be excluded from the topology, and a set for link-pairs to be included in the topology,
wherein the determining the values associated with the communication network further comprises determining at least one of: a demand associated with each telecommunication node, a capacity level of each link type, an actual capacity of each link between each pair of telecommunication nodes of each link type, a maximum number of hops allowed for each given telecommunication node that is considered a cell site to be connected to telecommunication node that is considered as a final sink node for the cell site, and a maximum number of microwaves dishes to be allowed at each given telecommunication node.

2. The method of claim 1, wherein the input data comprises at least one of: a list of telecommunication nodes that are considered sink nodes, a list of telecommunication nodes that are considered cell sites, a list of links to be included in the topology, a list of link-pairs to be included in the topology, a list of links to be excluded from the topology, a list of link-pairs to be excluded from the topology, a maximum number of hops to be allowed between a cell site and a sink node, a maximum number of antennas to be allowed at a cell site, a degree of redundancy associated with each cell site, a maximum number of cell sites allowed in a clustered microwave topology, a maximum number of sink nodes allowed in the topology, a traffic demand associated with each cell site, a list of types of links, a capacity level of each type of link, an actual capacity of each link between two telecommunication nodes of each type of link, a cost associated with each link, and a distance between each pairs of cell sites.

3. The method of claim 1, wherein the determining the values associated with the communication network further comprises determining at least one of: a set for telecommunication nodes to be clustered via microwaves, a set for valid potential links between each of the telecommunication nodes to be clustered and one or more sink nodes, and a set for links to be included in the topology.

4. The method of claim 1, wherein the set for links to be excluded from the topology is constructed via a user input that provides a preference, wherein the preference indicates that links without line-of-sight are to be excluded from the topology.

5. The method of claim 4, wherein the set for links to be excluded from the topology is determined by performing a pre-processing to identify and eliminate all links without line-of-sight from consideration.

6. The method of claim 5, wherein the pre-processing is based on at least one of: a maximum allowed link distance and a maximum microwave range.

7. The method of claim 1, wherein the set for links to be excluded from the topology is constructed by adding a penalty term in the objective function, wherein the penalty term penalizes links without line-of-sight.

8. The method of claim 1, wherein the set for link-pairs to be excluded from the topology is constructed via a user input that provides a preference,
wherein the preference indicates that link-pairs that fail to meet at least one separation rule are to be excluded from the topology.

9. The method of claim 8, wherein the set of link-pairs to be excluded from the topology is determined by performing a pre-processing to identify pairs of links that fail to meet the at least one separation rule, and eliminating at least one link of each of the pairs of links that fails to meet the at least one separation rule.

10. The method of claim 9, wherein the pre-processing to identify the pairs of links that fail to meet the at least one separation rule performs the identifying each pair of links that fails to meet the at least one separation rule by running a link-pair exclusion algorithm.

11. The method of claim 10, wherein the link-pair exclusion algorithm identifies links as failing to meet the at least one separation rule when at least one of: a minimum microwave beam angle restriction requirement and a physical separation requirement, is violated.

12. The method of claim 1, wherein the set of link-pairs to be excluded from the topology is constructed via a user input, wherein the user input provides pairs of links, wherein at most one of the links of the pairs of links is to be activated at the same time.

13. The method of claim 1, further comprising:
adding a constraint to the objective function for each link-pair in the set of link-pairs to be excluded from the topology, wherein the constraint is a link pair exclusion constraint.

14. The method of claim 1, further comprising:
providing a report.

15. The method of claim 1, further comprising:
receiving feedback from a user.

16. The method of claim 1, wherein the determining the values associated with the communication network further comprises determining at least one of: a cost of each microwave link, and a distance between each pair of locations.

17. The method of claim 1, wherein the plurality of penalty factors comprises a penalty factor associated with a cost of deploying a microwave link.

18. A non-transitory computer-readable medium storing a plurality of instructions which, when executed by a processor, cause the processor to perform operations for providing a topology for interconnection of telecommunication nodes in a communication network, the operations comprising:
obtaining input data;
determining values of: a set, a parameter, and a variable associated with the communication network in accordance with the input data; and
determining the topology for the interconnection via microwave links of the telecommunication nodes from an objective function in accordance with the set, the parameter, and the variable, wherein the objective function is based on a plurality of penalty factors, wherein the plurality of penalty factors comprises a penalty factor associated with a failure to meet a line-of-sight objective,
wherein the determining the values associated with the communication network comprises determining at least one of: a set for telecommunication nodes that are sink nodes, a set for links without line-of-sight, a set for microwave link types, a set for links to be excluded from the topology, a set for link-pairs to be excluded from the topology, and a set for link-pairs to be included in the topology,
wherein the determining the values associated with the communication network further comprises determining at least one of: a demand associated with each telecommunication node, a capacity level of each link type, an actual capacity of each link between each pair of telecommunication nodes of each link type, a maximum number of hops allowed for each given telecommunication node that is considered a cell site to be connected to telecommunication node that is considered as a final sink node for the cell site, and a maximum number of microwaves dishes to be allowed at each given telecommunication node.

19. An apparatus for providing a topology for interconnection of telecommunication nodes in a communication network, comprising:
a processor; and
a computer-readable medium storing a plurality of instructions which, when executed by the processor, cause the processor to perform operations, the operations comprising:
obtaining input data;
determining values of: a set, a parameter, and a variable associated with the communication network in accordance with the input data; and
determining the topology for the interconnection via microwave links of the telecommunication nodes from an objective function in accordance with the set, the parameter, and the variable, wherein the objective function is based on a plurality of penalty factors, wherein the plurality of penalty factors comprises a penalty factor associated with a failure to meet a line-of-sight objective,
wherein the determining the values associated with the communication network comprises determining at least one of: a set for telecommunication nodes that are sink nodes, a set for links without line-of-sight, a set for microwave link types, a set for links to be excluded from the topology, a set for link-pairs to be excluded from the topology, and a set for link-pairs to be included in the topology,
wherein the determining the values associated with the communication network further comprises determining at least one of: a demand associated with each telecommunication node, a capacity level of each link type, an actual capacity of each link between each pair of telecommunication nodes of each link type, a maximum number of hops allowed for each given telecommunication node that is considered a cell site to be connected to telecommunication node that is considered as a final sink node for the cell site, and a maximum number of microwaves dishes to be allowed at each given telecommunication node.

* * * * *